Sept. 3, 1935.    G. LEHRLING    2,013,614
GLASS LAY ROLLER
Filed May 23, 1935    2 Sheets-Sheet 1

Inventor
George Lehrling.
By F. K. Bryant
Attorney

Sept. 3, 1935.   G. LEHRLING   2,013,614
GLASS LAY ROLLER
Filed May 23, 1935   2 Sheets-Sheet 2
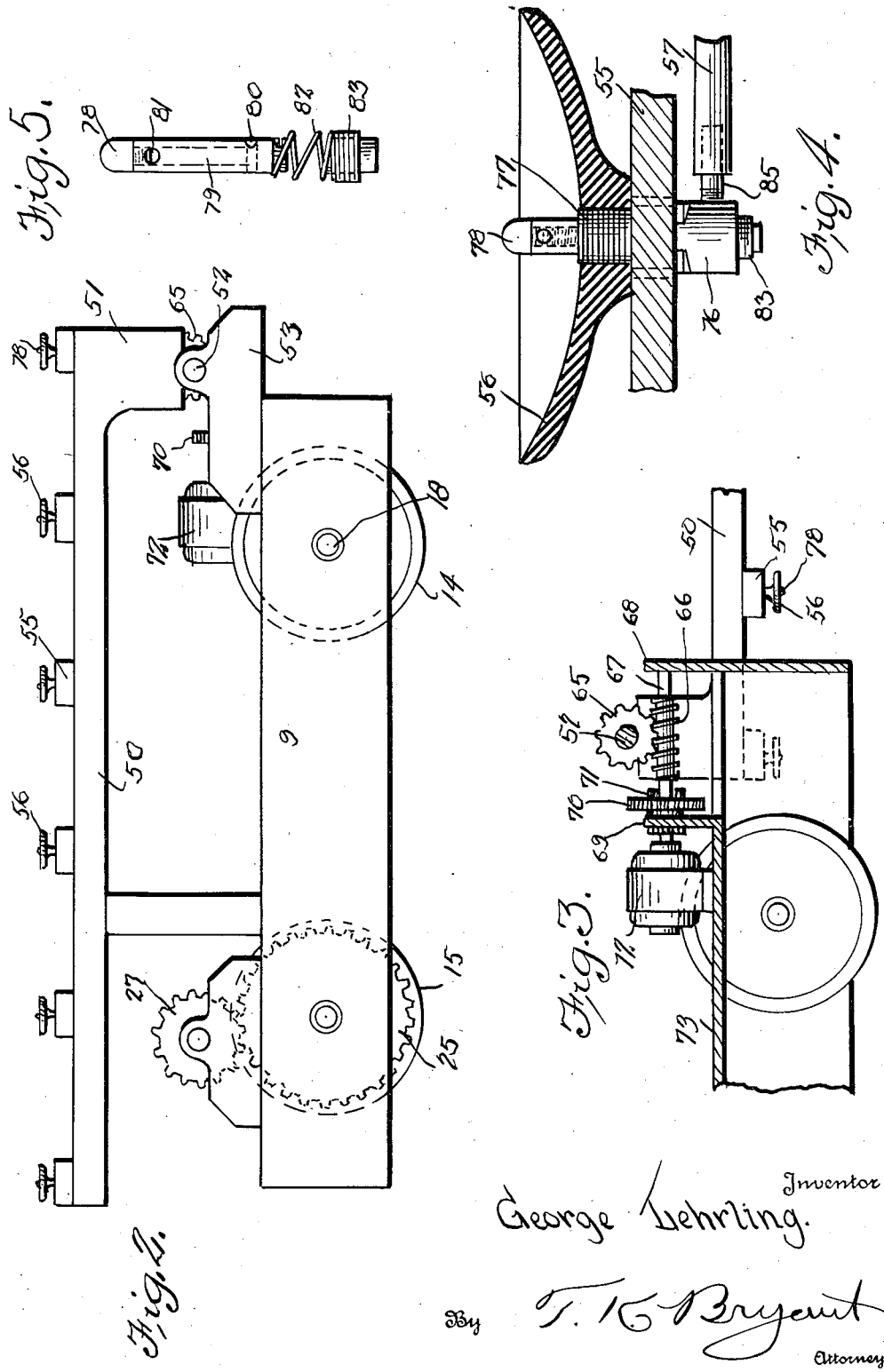
Inventor
George Lehrling.
By T. K. Bryant
Attorney Patented Sept. 3, 1935

2,013,614

UNITED STATES PATENT OFFICE 2,013,614

GLASS LAY ROLLER

George Lehrling, Ottawa, Ill.

Application May 23, 1935, Serial No. 23,110

9 Claims. (Cl. 51—277)

This invention relates to improvements in glass lay rollers.

The primary object of this invention is to provide a device of the above mentioned character which may be used in the glass industry, particularly plate glass for the purpose of turning the plate glass incident to the rolling operation.

A further object of this invention is to provide a device for the manipulation of plate glass without liability of breakage or damage thereto.

A still further object of this invention is to provide a device of the above mentioned character having a series of rollers carried by a wheeled guide frame for the purpose of rolling the plate glass onto plaster of Paris prior to the polishing operation.

A further object of the invention is to provide a device of the above mentioned character having a swinging frame adapted to be operated by an electric motor, for the purpose of overturning the glass after it has been rolled for handling purposes.

A still further object of the invention is to provide suction means carried by the swinging frame for gripping the glass after it has been rolled so that the swinging frame may turn the glass to its reverse side after it has been lifted from the table.

A still further object of this invention is to provide control means for controlling the movement of the wheeled frame and the swinging movement of the swinging frame from a platform on the wheeled frame.

Other objects and advantages of the invention will become apparent during the course of the following description, forming a part of the specification and taken with the drawings, wherein, Figure 1 is a top elevational view of the device embodying this invention, illustrating the lay rollers and the swinging frame in position for placing the glass prior to its polishing operation;

Figure 2 is an end elevational view illustrating the wheeled frame and showing the swinging frame secured thereto;

Figure 3 is a longitudinal cross sectional view through a fragmentary portion of the wheeled frame illustrating the motor drive for the swinging frame;

Figure 4 is a vertical cross sectional view through one of the vacuum cups for gripping the plate glass illustrating the same greatly enlarged and showing the plunger controlled valve operable upon contact with the plate glass; and Figure 5 is an exploded view of the valve showing the valve sleeve and the coil spring for normally holding the valve in its closed position.

Figure 1:
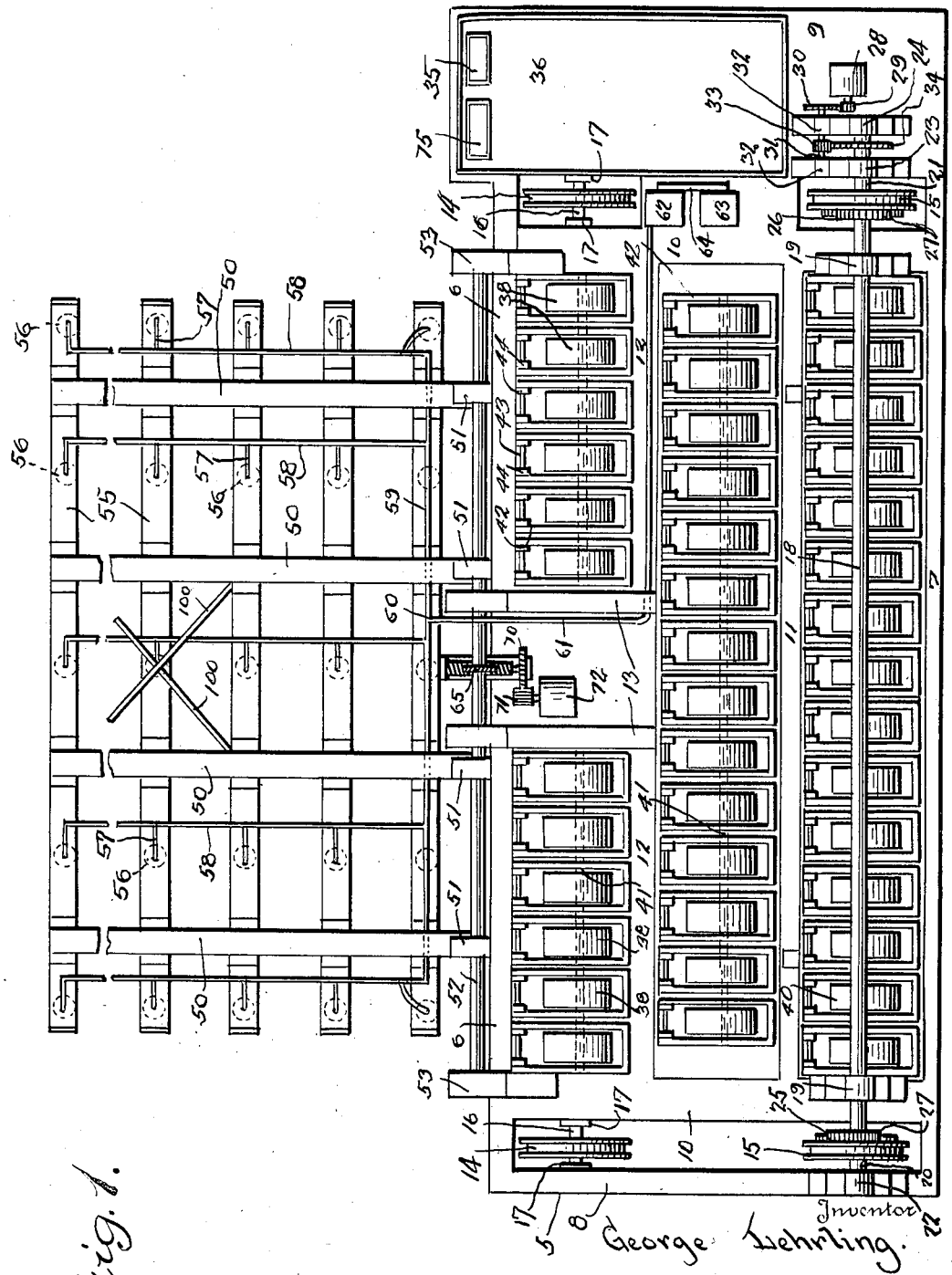

In the drawings, wherein for the purpose of illustrating the invention and wherein like reference characters will be employed to designate like parts throughout the same, the reference character 5 will generally be employed to designate a wheeled frame comprising side bars 6 and 7 connected by end bars 8 and 9.

The frame bars are connected by transverse bars 10 across which extends longitudinal bar members 11 and 12. It will be noted that the longitudinal bars 12 connect the end transverse frame members 10 and have their inner ends connected to frame bars 13.

The wheeled frame 5 is adapted to be supported by supporting wheels 14 and 15 and said supporting wheels 14 are mounted on a stub axle 16 having the ends secured in journals 17 formed in the frame end bars 8 and 9 and transverse bars 10. The supporting wheels 15 are adapted to be driven by gears 27 mounted on the shaft 18, the ends of which are mounted in journal bearings 19.

The drive wheels 15 are supported by stub shafts 20 and 21 journalled in bearings 22 and 23 respectively mounted on the wheeled frame, and an additional bearing 24 is mounted adjacent the bearing 23 for accommodating the reduction gearing.

One end of the shaft 21 is extended through the bearings 23 and 24.

Each of the wheels 15 is provided with gear wheels 25 and 26 adapted to mesh with the gears 27 mounted on the ends of the shaft 18.

The drive for the wheels 15 includes an electric motor 28 having the armature shaft gear 29 adapted to mesh with a gear wheel 30 mounted on a stub shaft 31 having its ends journalled in bearings 32 and said stub shaft 31 is provided with a reduction gear 33 meshing with a gear 34 rigidly secured to the drive axle 21.

By controlling the electric motor 28 from a switch board 35 located on the platform 36, the wheeled frame 5 may be traversed over a plain surface so that the lay rollers may engage the glass for rolling purposes. The lay rollers will be hereinafter more fully described in their association with the wheeled frame.

The lay roller arrangement comprises three or more banks of rollers 38, 39 and 40 which are mounted on shafts 41 having the ends mounted in U-shaped swinging frames 42 hinged to the wheeled frame bars 6, 12 and 11 as at 43 whereby said rollers may swing upwardly and downwardly as desired. Each of the rollers is preferably formed of iron or steel having the tread portion coated with rubber forming rubber treads thereon and it is to be noted that each U-shaped frame 42 is hinged by means of the pin 43 to bearings 44.

The swinging frame comprises a plurality of transverse bars 50 having their inner ends provided with offsets 51 adapted to be connected to an operating rod 52 in a rigid manner and said operating rod 52 has its ends journaled in bearing blocks 53 carried by the transverse frame members 10 as clearly shown in Figure 1.

Connected to the transverse frame bars 50 are frame bars 55 secured in place in any desired manner and arranged on each frame bar 55 at spaced intervals thereon are vacuum cups 56 connected by pipes 57 to transverse manifolds 58 and each of the manifold pipes 58 have their inner ends connected to longitudinal pipes 59 having a connection as at 60 with a pipe 61 leading to a suction pump 62 carried by the frame 5 and mounted on the transverse frame bars 10. An electric motor 63 is provided for driving the suction pipe 62 and is connected thereto by means of a belt or drive chain 64.

Means is provided for swinging the frame including the bars 50 and 55 and comprises a worm gear 65 rigidly attached to the shaft 52 meshing with a worm wheel 66 secured on a shaft which has its ends journalled in bearing portions 68 and 69 of the frame 5. This construction is shown clearly in Figure 3. On one end of the shaft 67 there is provided a gear wheel 70 adapted to be driven by means of a gear wheel 71 mounted on the armature shaft of an electric motor 72 which is attached or mounted on a platform 73 on the frame structure 5.

The electric motor 72 may be controlled from a switch board 75 located on the platform 36 on the wheel frame 5 and is placed in close relation to the traversing motor switch board 35 so that the operator may stand upon the platform 36 and control all movements of the device.

Each of the suction cups 56 is formed of rubber as clearly shown in Figure 4 and includes a sleeve 76 having a reduced portion 77 adapted to extend through the longitudinal frame bars 55. The suction cup 56 is threaded upon the screw threaded portion 77 of the sleeve 76 in order to hold the structure in assembled position. Slidably mounted within the sleeve 76 is a valve stem 77 having a longitudinal port 79 connected at each end by transverse ports 80 and 81. The valve stem 78 is normally forced upwardly by means of a coil spring 82 having one end engaging the lower portion of the valve stem and the opposite end engaged by a screw threaded plug 83 threaded in the sleeve 76 as shown clearly in Figure 4. The valve sleeve 76 is provided with an off-take pipe 85 adapted to connect to the branch pipe 57 and in communication with the stem 85 within the valve sleeve 76 there is provided a bore adapted to register with the transverse bore 80 in the valve stem 78 so that when the stem 78 contacts the work or plate glass, suction will be created in the vacuum cup 56. As soon as the suction is released, the work may be freed and the valve stem 78 will be projected outwardly by the coil spring 82 to close the opening between the pipe 57, valve sleeve 76 and valve stem 78.

Space bars 100 may be connected to certain transverse frame members 50 on the swinging carrier to reinforce and strengthen the structure so as to prevent possible damage to the plate glass resulting from warping or twisting.

In operation, the wheel frame 5 is positioned upon trackways which are received in the grooves of the wheels 14 and 15 and said trackways may be mounted or located on opposite sides of an iron polishing table so that the frame may be traversed thereover. The plate glass is positioned upon the swinging frame when the same is in a horizontal position shown in Figure 2 so that it may be placed upon the table by swinging the frame from the position shown in Figure 2 to the position shown in Figure 1. When the plate glass is placed upon the swinging frame in the position shown in Figure 2, the suction device 62 is operated to cause the glass plate to stick to the frame whereby swinging movement of the frame may reverse the plate glass when being placed upon the iron polishing table. After the plate glass has been thus placed in position upon the iron polishing table upon a mass of plaster of Paris, the swinging frame is released from the plate glass so that it may be moved to its initial position.

The traversing mechanism is then operated to cause the frame 5 to move over the plate glass carrying with it the rollers 38, 39 and 40, causing the glass to assume an even position on the polishing table prior to its polishing operation.

It is to be understood that the operator may stand upon the platform 36 and manipulate the machine by the controls 35 and 75 for the traversing mechanism and swinging frame control mechanism.

The glass plate so positioned is then moved along with the polishing table to the grinding and polishing mechanism and the wheeled frame is moved in position for receiving another piece of work.

Controls for the electric motor 63 may be also provided so that the suction cups may grip and release the work at the command of the operator.

It is to be understood that the form of the invention herewith shown and described is to be taken as the preferred embodiment of the same and that minor changes may be made therein without departing from the spirit and scope of the invention as claimed.

I claim:—

1. A device of the character described comprising a wheeled frame, a vertically swinging frame pivoted to the wheeled frame, suction devices carried by the swinging frame and work engaging rollers carried by the wheeled frame.

2. A device of the character described comprising a wheeled frame, a plurality of work engaging rollers carried by the wheeled frame, a vertically swinging frame pivoted to the wheeled frame, and a series of suction devices carried by the vertical swinging frame.

3. A device of the character described comprising an electrically driven wheeled frame, a plurality of work engaging rollers carried by the wheeled frame, a vertically swinging frame pivoted to the wheeled frame, a series of suction devices carried by the vertically swinging frame, means for operating the electric drive for the wheeled frame and means for operating the vertically swinging frame.

4. A device of the character described comprising a wheeled frame, means for driving the wheeled frame, a vertically swinging frame pivoted to the wheeled frame, suction devices for gripping an object carried by the swinging frame and a plurality of rollers mounted on the wheeled frame.

5. A device of the character described comprising a wheeled frame, means for operating the wheeled frame, including an electric motor, gearing connecting the motor armature shaft to the drive wheels, a plurality of rollers mounted on the wheeled frame, a vertically swinging frame, pivoted to the wheeled frame, a series of vacuum devices mounted on the vertically swinging frame and means for operating the swinging frame.

6. A device of the character described comprising an electrically driven wheeled frame, a plurality of rollers mounted in spaced relation from the ground surfaces on the wheeled frame, a vertically swinging frame pivoted to the wheeled frame, a series of suction cups mounted on the swinging frame, means for creating suction within the vacuum cups, means for operating the vertically swinging frame, and suction controlling devices carried by each vacuum cup.

7. A device of the character described comprising an electrically driven wheeled frame, a plurality of rollers mounted on the frame in spaced relation from the surface over which the frame travels, a vertically swinging frame pivotally secured to the wheeled frame, suction devices mounted on the vertically swinging frame, an electric motor for operating the vertically swinging frame, means for creating suction in the suction devices, control valves carried by each suction device and a control board for operating the wheeled frame motor and the swinging frame motor.

8. A device of the character described comprising an electrically driven wheeled frame, a plurality of work engaging rollers mounted on the wheeled frame, a vertically swinging frame pivoted to the wheeled frame, a series of suction devices carried by the vertically swinging frame, means for creating suction in said devices, means for controlling said suction and means for swinging the vertically swinging frame, including an electric motor gear secured to the armature shaft thereof, a gear on the pivot point of said vertically swinging frame, and reduction gearing connecting the first mentioned gears.

9. A device of the character described, comprising a wheeled frame, an electric motor for driving the wheeled frame, a plurality of work engaging rollers carried by the wheeled frame, a vertically swinging frame, mounted on the wheeled frame, an electric motor for operating the swinging frame, suction devices carried by the swinging frame, and means operable from a common location on the wheeled frame for controlling the electric motors for the wheeled frame, and vertically swinging frame whereby said device may be traversed over sheet work to cause the rollers to engage the work and the swinging frame may move the work to the rolling position.

GEORGE LEHRLING.